(12) United States Patent
Humphrey

(10) Patent No.: US 11,273,494 B2
(45) Date of Patent: Mar. 15, 2022

(54) METHODS OF MAKING METAL PARTICLES

(71) Applicant: BOARD OF REGENTS, THE UNIVERSITY OF TEXAS SYSTEM, Austin, TX (US)

(72) Inventor: Simon M. Humphrey, Lakeway, TX (US)

(73) Assignee: Board of Regents, the University of Texas System, Austin, TX (US)

(*) Notice: Subject to any disclaimer, the term of this patent is extended or adjusted under 35 U.S.C. 154(b) by 224 days.

(21) Appl. No.: 16/494,800

(22) PCT Filed: Mar. 16, 2018

(86) PCT No.: PCT/US2018/022815
§ 371 (c)(1),
(2) Date: Sep. 17, 2019

(87) PCT Pub. No.: WO2018/182995
PCT Pub. Date: Oct. 4, 2018

(65) Prior Publication Data
US 2020/0276647 A1    Sep. 3, 2020

Related U.S. Application Data

(60) Provisional application No. 62/473,102, filed on Mar. 17, 2017.

(51) Int. Cl.
*B22F 9/24* (2006.01)
*B01J 37/04* (2006.01)
(Continued)

(52) U.S. Cl.
CPC ............ *B22F 9/24* (2013.01); *B01J 23/464* (2013.01); *B01J 37/04* (2013.01); *B22F 1/0018* (2013.01);
(Continued)

(58) Field of Classification Search
None
See application file for complete search history.

(56) References Cited

U.S. PATENT DOCUMENTS 6,387,494 B1    5/2002  Yanagida
6,833,019 B1 *  12/2004 Lewis, III ............ B22F 1/0018
                                                    75/345
(Continued)

FOREIGN PATENT DOCUMENTS

JP    2010100899    5/2010
WO    2014169235    10/2014

OTHER PUBLICATIONS

International Preliminary Report on Patentability dated Sep. 26, 2019 in International Application No. PCT/US2018/022815 (7 pages).
(Continued)

*Primary Examiner* — George Wyszomierski
(74) *Attorney, Agent, or Firm* — Meunier Carlin & Curfman LLC

(57) ABSTRACT

Disclosed herein are methods of making a plurality of metal particles, the methods comprising: injecting a metal particle precursor, a capping material, and a reducing agent into an inlet of a continuous flow microwave reactor, thereby forming a mixture within the continuous flow microwave reactor, wherein the inlet of the continuous flow microwave reactor is fluidly connected to an outlet of the continuous flow microwave reactor through a reaction vessel; flowing the mixture through the reaction vessel, wherein the metal particle precursor is reduced within the reaction vessel, thereby forming the plurality of metal particles; and collecting the plurality of metal particles from the outlet of the continuous flow microwave reactor.

21 Claims, 6 Drawing Sheets

(51) Int. Cl.
 B22F 1/00 (2022.01)
 B01J 23/46 (2006.01)
 B01J 21/08 (2006.01)

(52) U.S. Cl.
 CPC ............ *B01J 21/08* (2013.01); *B22F 2202/11* (2013.01); *B22F 2301/25* (2013.01); *B22F 2302/45* (2013.01); *B22F 2303/01* (2013.01); *B22F 2304/054* (2013.01)

(56) References Cited

U.S. PATENT DOCUMENTS

| | | | |
|---|---|---|---|
| 7,575,621 | B2 | 8/2009 | Vanheusden et al. |
| 7,625,637 | B2 | 12/2009 | Kim |
| 7,749,299 | B2 | 7/2010 | Vanheusden et al. |
| 8,158,031 | B2 | 4/2012 | Lee et al. |
| 8,361,921 | B2 | 1/2013 | Starz et al. |
| 8,367,266 | B2 | 2/2013 | Harkness et al. |
| 2004/0003680 | A1 | 1/2004 | Wasmund et al. |
| 2004/0087441 | A1 | 5/2004 | Bock et al. |
| 2008/0318765 | A1 | 12/2008 | Aradi et al. |
| 2010/0269635 | A1 | 10/2010 | Vanheusden et al. |
| 2011/0256197 | A1 | 10/2011 | Southward |
| 2014/0264171 | A1* | 9/2014 | Schut ................... B01J 19/0093 252/301.4 S |
| 2016/0039008 | A1 | 2/2016 | Humphrey et al. |

OTHER PUBLICATIONS

Al-Saidi et al. Adsorption of polyvinylpyrrolidone on Ag surfaces: insight into a structure-directing agent. Nano Lett. 2012, 12, 997-1001.
Astruc et al. Nanoparticles as recyclable catalysts: the frontier between homogeneous and heterogeneous catalysis. Angew. Chem. Int. Ed. 2005, 44, 7852-7872.
Baek et al. Investigation of Indium Phosphide Nanocrystal Synthesis Using a High-Temperature and High-Pressure Continuous Flow Microreactor. Angew. Chem. Int. Ed. 2011, 50, 653-656.
Borodko et al. Charge-transfer interaction of poly (vinylpyrrolidone) with platinum and rhodium nanoparticles. J. Phys. Chem. C, 2007, 111, 6288-6295.
Bratlie et al. Platinum nanoparticle shape effects on benzene hydrogenation selectivity. Nano Lett., 2007, 10, 3097-3101.
Chan et al. Size-controlled growth of CdSe nanocrystals in microfluidic reactors. Nano Lett., 2003, 3, 199-201.
Chen et al. One-dimensional nanostructures of metals: large-scale synthesis and some potential applications. Langmuir, 2007, 23, 4120-4129.
Cremer et al. Hydrogenation and dehydrogenation of propylene on Pt (111) studied by sum frequency generation from UHV to atmospheric pressure. J. Phys. Chem., 1996, 100, 16302-16309.
Crespo-Quessada et al. Structure sensitivity of alkynol hydrogenation on shape- and size-controlled palladium nanocrystals: which sites are most active and selective? JACS, 2011, 133, 12787-12.
Dahal et al. Beneficial effects of microwave-assisted heating versus conventional heating in noble metal nanoparticle synthesis. ACS Nano 2012, 6, 9433-9446.
Essenger-Hileman et al. Aqueous room-temperature synthesis of Au—Rh, Au—Pt, Pt—RH, and Pd—Rh alloy nanoparticles: fully tunable compositions within the miscibility gaps. Journal of Materials Chemistry, accepted Feb. 2, 2011, 21, 11599-11604.
Fan et al. Facet-selective epitaxial growth of heterogeneous nanostructures of semiconductor and metal: ZnO nanorods on Ag nanocrystals. JACS, 2009, 131, 12036-12037.
García et al. Effect of microwave heating on the synthesis of rhodium nanoparticles in ionic liquids. Inorg. Chim. Acta 2014, 422, 65-69.
García et al. Microwave-Assisted Synthesis of Metallic Nanoparticles, Ch. 9 (Ed: Erwann Guénin), Pan Stanford Publishing, Singapore, 2016, pp. 263-286.
García et al. Microwave synthesis of Au—Rh core-shell nanoparticles and implication of the shell thickness in hydrogenation catalysis. Chem. Commun. 2013, 49, 4241-4243.
García et al. Microwave synthesis of classically immiscible rhodium-silver and rhodium-gold alloy nanoparticles: Highly active hydrogenation catalysts. ACS Nano 2014, 8, 11512-11521.
Heard et al. Structural and Energetic Trends of Ethylene Hydrogenation over Transition Metal Surfaces. J. Phys. Chem. C, 2016, 120, 995-1003.
Heuer-Jungemann et al. The role of ligands in the chemical synthesis and applications of inorganic nanoparticles. Chemical Reviews, 2019, 119, 4819-4880.
Humphrey et al. Rhodium nanoparticles from cluster seeds: Control of size and shape by precursor addition rate. Nano Lett., 2007, 7, 785-790.
Jiang et al. Recent progress in synergistic catalysis over heterometallic nanoparticles. J mater Chem, 2011, 21, 13705-13725.
Knauer et al. Microsegmented flow-through synthesis of silver nanoprisms with exact tunable optical properties. J. Phys. Chem. C, 2012, 116, 9251-9258.
Kunal et al. Microwave-Assisted Synthesis of PdxAu100-x Alloy Nanoparticles: A Combined Experimental and Theoretical Assessment of Synthetic and Compositional Effects upon Catalytic Reactivity. ACS Catal., 2016, 6, 4882-4893.
Lazarus et al. Flow-Focused Synthesis of Monodisperse Gold Nanoparticles Using Ionic Liquids on a Microfluidic Platform. Lab on a Chip 2010, 10, 3377-3379.
Lazarus et al. Two-phase microfluidic droplet flows of ionic liquids for the synthesis of gold and silver nanoparticles. ACS Appl. Mater. Interfaces, 2012, 4, 3077-3083.
Lin et al. Synthesis of silver nanoparticles in a continuous flow tubular microreactor. Nano Lett. 2004, 4, 2227-2232.
Lopez et al. Synthesis and Characterization of gold nanoparticles (AuNPs) and their electrophoretic deposition. ECS transactions, 2010, 29(1), 171-181.
Nightingale et al. Large-scale synthesis of nanocrystals in a multi-channel droplet reactor. J. Mater. Chem. A, 2013, 1, 4067-4076.
Niu et al. Synthesis of Pt—Ni Octahedra in Continuous-flow Droplet Reactors for the Scalable Production of Highly Active Catalysts toward Oxygen Reduction. Nano lett. 2016, 16, 3850-3857.
Petroski et al. Kinetically controlled growth and shape formation mechanism of platinum nanoparticles. J. Phys. Chem. B, 1998, 102, 3316-3320.
Riche et al. Flow invariant droplet formation for stable parallel microreactors. Nat. Commun., 2016, 7, 1-7.
Roberts et al. High-Throughput Continuous Flow Synthesis of Nickel Nanoparticles for the Catalytic Hydrodeoxygenation of Guaiacol. ACS Sustainable Chemistry & Engineering 2017, 5, 632-639.
Sau et al. Properties and applications of colloidal nonspherical noble metal nanoparticles. Adv. Mater., 2010, 22, 1805-1825.
Shestopalov et al. Multi-step syn-thesis of nanoparticles performed on millisecond time scale in a microfluidic droplet-based system. Lab on a Chip, 2004, 4, 316-321.
Smith et al. The effect of strongly bound oxygen on the dehydrogenation and hydrogenation activity and selectivity of platinum single crystal surfaces. J. Catal., 1979, 57, 426-443.
Somorjai et al. Molecular Studies of Model Sur-faces of Metals from Single Crystals to Nanoparticles under Cata-lytic Reaction Conditions. Evolution from Prenatal and Postmortem Studies of Catalysts. Langmuir, 2010, 26, 16190-16203.
Somorjai et al. The evolution of model catalytic systems; studies of structure, bonding and dynamics from single crystal metal surfaces to nanoparticles, and from low pressure (< 10-3 Torr) to high pressure (> 10-3 Torr) to liquid interfaces. Phys. Chem. Chem. Phys., 2007, 9, 3500-3513.
Svastenko et al. Synthesis of nanostructures lean-NOx catalysts by direct laser deposition of monometallic Pt-, Rh-, and bimetallic PtPh-nanoparticles on SiO2 support. J Nanopart Res, 2008, 10, 277-287.
Tao et al. Shape control of colloidal metal nanocrystals. Small, 2008, 4, 310-325.

(56) References Cited

OTHER PUBLICATIONS

Tice et al. Formation of Droplets and Mixing in Multiphase Microfluidics at Low Values of the Reynolds and Capillary Numbers. Langmuir 2003, 19, 9127-9133.

Tu et al. Synthesis of polymer-stabilized platinum/ruthenium bimetallic colloids and their catalytic properties for selective hydrogenation of crotonaldehyde. Chinese Journal of Polymer Science, 2005, 23(5), 487-495.

Watzky et al. Transition metal nanocluster formation kinetic and mechanistic studies. A new mechanism when hydrogen is the reductant: slow, continuous nucleation and fast autocatalytic surface growth. J. Am. Chem. Soc., 1997, 119, 10382-10400.

Yang et al. Reaction kinetics and in situ sum frequency generation surface vibrational spectroscopy studies of cycloalkene hydrogenation/dehydrogenation on Pt (111): Substituent effects and CO poisoning. J. Catal., 2006, 237, 255-266.

Yoo et al. A facile one-pot synthesis of hydroxyl-functionalized gold polyhedrons by a surface regulating copolymer. Chem. Mater., 2009, 21, 939-944.

Yuan et al. Advances in the rational de-sign of rhodium nanoparticle catalysts control via manipulation of the nanoparticle core and stabilizer. ACS Catal. 2012, 2, 1057-1069.

Zaera et al. Hydrogenation of ethylene over platinum (111) single-crystal surfaces. JACS, 1984, 106, 2288-2293.

Zettsu et al. Synthesis, Stability, and Surface Plasmonic Properties of Rhodium Multipods, and Their Use as Substrates for Surface-Enhanced Raman Scattering. Angew. Chem. Int. Ed. 2006, 118, 1310-1314.

Zheng et al., N.; Fan, J.; Stucky, G. D. One-step one-phase synthesis of monodisperse noble-metallic nanoparticles and their colloidal crystals. JACS, 2006, 128, 6550-6551.

Zhong et al. Facile synthesis of morphology-controlled platinum nanocrystals. Chem. Ma-ter., 2006, 18, 2468-2471.

Ziegelbauer et al. Chalcogenide electrocatalysts for oxygen-depolarized aqueous hydrochloric acid electrolysis. Electrochim. Acta, 2007, 52, 6282-6294.

International Search Report and Written Opinion dated Aug. 29, 2018, from International Application No. PCT/US2018/022815, 9 pages.

Nishioka, M. et al. "Continuous synthesis of monodispersed silver nanoparticles using a homogeneous heating microwave reactor system", Nanoscale, 2011, 4, 2621-2626.

Kunal, P. et al. "Continuous Flow Synthesis of Rh and RhAg Alloy Nanoparticle Catalysts Enables Scalable Production and Improved Morphological Control", Chemistry of Materials, vol. 29, No. 10, Apr. 2017, 2 pages.

* cited by examiner

METHODS OF MAKING METAL PARTICLES

CROSS-REFERENCE TO RELATED APPLICATIONS

This application is a national stage application filed under 35 U.S.C. § 371 of PCT/US2018/022815 filed Mar. 16, 2018, which claims the benefit of priority to U.S. Provisional Application No. 62/473,102, filed Mar. 17, 2017, which are both hereby incorporated herein by reference in their entireties.

STATEMENT OF GOVERNMENT SUPPORT

This invention was made with government support under Grant Nos. CHE1505135 and CMMI1068212 awarded by the National Science Foundation. The government has certain rights in this invention.

BACKGROUND

The synthesis of well-defined metallic nanoparticles (MNPs) is becoming increasingly central to the field of heterogeneous catalysis (Astruc D et al. Angew. Chem. Int. Ed 2005, 44, 7852-7872). Small (2-10 run) metallic nanoparticles display large surface area to volume ratios and exhibit other advantageous chemical and physical properties that are manifested at the nanoscale. Such properties can result in increased catalytic activity, selectivity, and/or stability. A distinct advantage of metallic nanoparticle catalysts is their potential to be synthesized with well-defined morphologies via solution-phase 'bottom-up' approaches: this is in stark contrast to the poorly defined morphologies typically achieved by traditional methods (e.g., incipient wetness impregnation of metal precursors followed by in situ nucleation and growth) (Zheng N et al. JACS, 2006, 128, 6550-6551). Morphological control is important because it dictates the metallic nanoparticle surface structure (i.e., the types of facets that are presented in individual nanocrystals). The ability to engineer metallic nanoparticle morphologies can ultimately engender control over catalytic reactivity and selectivity for specific reactions. This approach can be especially valuable when preparing colloidal catalysts with noble metals (e.g., Rh, Ir, Pd, Pt) because relationships between surface structure, reactivity, and selectivity for these face-centered cubic (FCC) metals are well understood from single crystal studies (Somorjai G A et al. Phys. Chem. Chem. Phys., 2007, 9, 3500-3513). Noble metals are employed as catalysts in a large number of industrial-scale catalytic processes (Sau T K et al. Adv. Mater., 2010, 22, 1805-1825). The thermodynamically most stable morphology for small (2-10 nm) metallic nanoparticles are cuboctahedra, which display a mixture of (111) and (100) faces. The metal surface structure can favor different catalytic pathways (even for simple, small molecule reactions) due to significant differences in reactant binding energies associated with each face (Bratlie K M et al. 1 Nano Lett., 2007, 10, 3097-3101; Crespo-Quessada M et al. JACS, 2011, 133, 12787-12). For example, alkenes can undergo hydrogenation or dehydrogenation as a function of surface structure effects (Zaera F and Somorjai G A. JACS, 1984, 106, 2288-2293; Cremer P S et al. J Phys. Chem., 1996, 100, 16302-16309; Yang M et al. J. Catal., 2006, 237, 255-266; Heard C J et al. J Phys. Chem. C, 2016, 120, 995-1003).

Over the past two decades, a great deal of effort has been made to gain a better understanding of how a careful choice of solvents and ligands used in metallic nanoparticle synthesis can directly influence particle size (Smith C E et al. J. Catal. 1979, 57, 426-443) and morphology (Zhong X et al. Chem. Mater., 2006, 18, 2468-2471; Yoo C I et al. Chem. Mater., 2009, 21, 939-944). However, inherent issues that prevent such syntheses from being easily scaled-up is an unsolved problem that presently impedes the utilization of well-defined metallic nanoparticles in large-scale industrial catalytic processes. For example, batch-type syntheses of colloidal metallic nanoparticles are extremely sensitive to heat and mass transport limitations, which become increasingly problematic for larger reactor volumes and/or higher reagent concentrations (Tao A R et al. Small, 2008, 4, 310-325). These scaling issues negatively influence nucleation and growth and result in lower monodispersity, inferior process reproducibility, and morphological inconsistency. The methods and systems discussed herein addresses these and other needs.

SUMMARY

In accordance with the purposes of the disclosed systems and methods, as embodied and broadly described herein, the disclosed subject matter relates to methods of making a plurality of metal particles. In some example, the disclosed subject matter relates to methods of making a plurality of metal particles using a continuous flow microwave reactor.

Additional advantages of the disclosed methods will be set forth in part in the description which follows, and in part will be obvious from the description. The advantages of the disclosed methods will be realized and attained by means of the elements and combinations particularly pointed out in the appended claims. It is to be understood that both the foregoing general description and the following detailed description are exemplary and explanatory only and are not restrictive of the disclosed methods as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
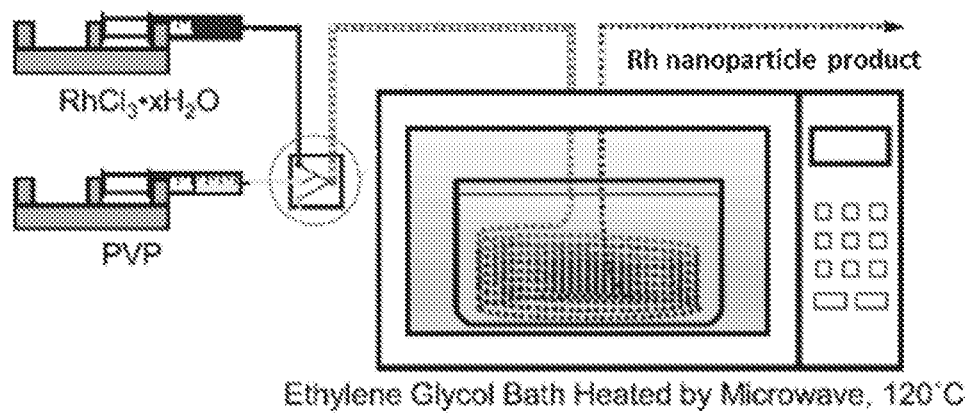
FIG. 1 is a schematic drawing of a reactor configuration, showing the syringe pumps injecting reagents and a carrier oil, droplet generator device, and tubing coil in the microwave cavity. In experiments with single-phase flow, a device without the carrier oil branch was used to combine the reagents.

The methods described herein may be understood more readily by reference to the following detailed description of specific aspects of the disclosed subject matter and the Examples included therein.

Before the present methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Disclosed herein are methods of making a plurality of metal particles, the methods comprising injecting a metal particle precursor, a capping material, and a reducing agent into an inlet of a continuous flow microwave reactor, thereby forming a mixture within the continuous flow microwave reactor. Injecting the metal particle precursor, capping material, and reducing agent into the inlet can be accomplished by any known means in the art. For example, the metal particle precursor, capping material, and reducing agent can be injected into the inlet via a syringe (e.g., a syringe pump).

The metal particle precursor can, for example, comprise a metal salt, the metal salt comprising a metal selected from the group consisting of Ru, Rh, Pd, Pt, Au, Ag, Os, Ir, and combinations thereof. In some examples, the metal particle precursor comprises a metal salt, the metal salt comprising a metal selected from the group consisting of Rh, Ag, and combinations thereof. In some examples, the metal particle precursor can comprise a solution of the metal salt, (e.g., the metal salt dissolved or dispersed in a solvent). Examples of suitable solvents include, but are not limited to water; ketones (e.g., acetone, methyl ethyl ketone, diethyl ketone, methyl n-propyl ketone, acetophenone, and cyclohexanone); linear, poly and cyclic ethers (e.g., diethyl ether, di-n-propyl ether, di-n-butyl ether, ethyl n-propyl ether, glyme, diglyme, tetrahydrofuran, 1,4-dioxane, 1,3-dioxolane); aromatic hydrocarbons (e.g., toluene, ethyl benzene, xylenes); alcohols (e.g., methanol, ethanol, 1-propanol, 2-propanol, isomers of butanol, isomers of pentanol, ethylene glycol, propylene glycol, glycerol); dimethylformamide; dimethoxyethane; dimethylacetamide; N-methylpyrrolidone; dimethylsulfoxide; and combinations thereof.

In some examples, the metal particle precursor comprises a first metal precursor and a second metal precursor, the first metal precursor comprising a first metal salt, and the second metal precursor comprising a second metal salt, the first metal salt comprising a first metal, the second metal salt comprising a second metal, wherein the first metal is different from the second metal. In some examples, the first metal precursor and the second metal precursor are provided at a ratio such that the molar ratio of the first metal to the second metal is 1:99 or more (e.g., 1:95 or more, 1:90 or more, 1:85 or more, 1:80 or more, 1:75 or more, 1:70 or more, 1:65 or more, 1:60 or more, 1:55 or more, 1:50 or more, 1:45 or more, 1:40 or more, 1:35 or more, 1:30 or more, 1:25 or more, 1:20 or more, 1:15 or more, 1:10 or more, 1:9 or more, 1:8 or more, 1:7 or more, 1:6 or more, 1:5 or more, 1:4 or more, 1:3 or more. 1:2 or more, 1:1 or more, 2:1 or more, 3:1 or more, 4:1 or more, 5:1 or more, 6:1 or more, 7:1 or more, 8:1 or more, 9:1 or more, 10:1 or more, 15:1 or more, 20:1 or more, 25:1 or more, 30:1 or more, 35:1 or more, 40:1 or more, 45:1 or more, 50:1 or more, 55:1 or more, 60:1 or more, 65:1 or more, 70:1 or more, 75:1 or more, 80:1 or more, 85:1 or more, 90:1 or more, or 95:1 or more).

In some examples, the first metal precursor and the second metal precursor are provided at a ratio such that the molar ratio of the first metal to the second metal is 99:1 or less (e.g., 95:1 or less, 90:1 or less, 85:1 or less, 80:1 or less, 75:1 or less, 70:1 or less, 65:1 or less, 60:1 or less, 55:1 or less, 50:1 or less, 45:1 or less, 40:1 or less, 35:1 or less, 30:1 or less, 25:1 or less, 20:1 or less, 15:1 or less, 10:1 or less, 9:1 or less, 8:1 or less, 7:1 or less, 6:1 or less, 5:1 or less, 4:1 or less, 3:1 or less, 2:1 or less, 1:1 or less, 1:2 or less, 1:3 or less, 1:4 or less, 1:5 or less, 1:6 or less, 1:7 or less, 1:8 or less, 1:9 or less, 1:10 or less, 1:15 or less, 1:20 or less, 1:25 or less, 1:30 or less, 1:35 or less, 1:40 or less, 1:45 or less, 1:50 or less, 1:55 or less, 1:60 or less, 1:65 or less, 1:70 or less, 1:75 or less, 1:80 or less, 1:85 or less, 1:90 or less, or 1:95 or less).

The molar ratio of the first metal to the second metal can range from any of the minimum values described above to any of the maximum values described above. For example, the first metal precursor and the second metal precursor are provided at a ratio such that the molar ratio of the first metal to the second metal is from 1:99 to 99:1 (e.g., from 1:99 to 1:1, from 1:1 to 99:1, from 1:99 to 1:50, from 1:50 to 1:1, from 1:1 to 50:1, from 50:1 to 99:1, from 70:30 to 30:70, or from 1:10 to 10:1).

In some examples, the capping material can comprise a solution of the capping material, (e.g., the capping material dissolved or dispersed in a solvent). In some examples, the solvent comprises ethylene glycol.

The reducing agent can be any material capable of reducing the metal particle precursor to form the plurality of metal particles. The reducing agent can, for example, comprise a borohydride, a citrate, an ascorbic acid, an amino acid, a surfactant (e.g., ethylene glycol), or a combination thereof. In some examples, the reducing agent can comprise ethylene glycol.

The inlet of the continuous flow microwave reactor is fluidly connected to an outlet of the continuous flow microwave reactor through a reaction vessel. In some examples, the continuous flow microwave reactor can comprise, a sample containment vessel, a microwave cavity, and a heating element. The sample containment vessel can, for example, have a first end fluidly connected to a second end through a reaction vessel portion, the first end of the sample containment vessel being the inlet of the continuous flow microwave reactor, the second end of the sample containment vessel being the outlet of the continuous flow microwave reactor. The reaction vessel portion is, for example, located within the microwave cavity and the inlet and the outlet are located outside of the microwave cavity. In some example, the reaction vessel is in thermal contact with the heating element.

The heating element can, for example, comprise a bath and the reaction vessel portion can be immersed in the bath. The bath can, for example, comprise an oil bath. In some example, the bath can comprise ethylene glycol.

As used herein, "a sample containment vessel" and "the sample containment vessel" are meant to include any number of sample containment vessels. Thus, for example, "a sample containment vessel" includes one or more sample containment vessels. In some examples, the sample containment vessel can comprise a plurality of sample containment vessels.

In some examples, the sample containment vessel can comprise a tube. The tube can comprise any suitable material. In some examples, the tube can comprise a polymer (e.g., polytetrafluoroethylene (PTFE)). As used herein, "a tube" and "the tube" are meant to include any number of tubes. Thus, for example, "a tube" includes one or more tubes. In some examples, the tube can comprise a plurality of tubes.

In some examples, the methods can further comprise heating the heating element using microwave irradiation. For example, the heating element can be heated to a temperature of 100° C. or more using microwave irradiation (e.g., 105° C. or more, 110° C. or more, 115° C. or more, 120° C. or more, 125° C. or more, 130° C. or more, 135° C. or more, 140° C. or more, 145° C. or more, 150° C. or more, 155° C. or more, 160° C. or more, 165° C. or more, 170° C. or more, 175° C. or more, 180° C. or more, 185° C. or more, 190° C. or more, or 195° C. or more). In some examples, the heating element can be heated to a temperature of 200° C. or less using microwave irradiation (e.g., 195° C. or less, 190° C. or less, 185° C. or less, 180° C. or less, 175° C. or less, 170° C. or less, 165° C. or less, 160° C. or less, 155° C. or less, 150° C. or less, 145° C. or less, 140° C. or less, 135° C. or less, 130° C. or less, 125° C. or less, 120° C. or less, 115° C. or less, 110° C. or less, or 105° C. or less). The temperature that the heating element is heated to via microwave irradiation can range from any of the minimum values described above to any of the maximum values described above. For example, the heating element can be heated to a temperature of from 100° C. to 200° C. using microwave irradiation (e.g., from 100° C. to 150° C., from 150° C. to 200° C., from 100° C. to 120° C. from 120° C. to 140° C. from 140° C. to 160° C. from 160° C. to 180° C. from 180° C. to 200° C. from 120° C. to 175° C., from 120° C. to 150° C., from 150° C. to 175° C., from 165° C. to 185° C., from 130° C. to 140° C., or from 110° C. to 130° C.).

In some example, the methods can further comprise heating the mixture in the reaction vessel using microwave irradiation. For example, the mixture can be heated to a temperature of 100° C. or more using microwave irradiation (e.g., 105° C. or more, 110° C. or more, 115° C. or more, 120° C. or more, 125° C. or more, 130° C. or more, 135° C. or more, 140° C. or more, 145° C. or more, 150° C. or more, 155° C. or more, 160° C. or more, 165° C. or more, 170° C. or more, 175° C. or more, 180° C. or more, 185° C. or more, 190° C. or more, or 195° C. or more). In some examples, the mixture can be heated to a temperature of 200° C. or less using microwave irradiation (e.g., 195° C. or less, 1900° C. or less, 185° C. or less, 180° C. or less, 175° C. or less, 170° C. or less, 165° C. or less, 160° C. or less, 155° C. or less, 150° C. or less, 145° C. or less, 140° C. or less, 135° C. or less, 130° C. or less, 125° C. or less, 120° C. or less, 115° C. or less, 110° C. or less, or 105° C. or less). The temperature that the mixture is heated to via microwave irradiation can range from any of the minimum values described above to any of the maximum values described above. For example, the mixture can be heated to a temperature of from 100° C. to 200° C. using microwave irradiation (e.g., from 100° C. to 150° C., from 150° C. to 200° C., from 100° C. to 120° C., from 120° C. to 140° C., from 140° C. to 160° C., from 160° C. to 180° C., from 180° C. to 200° C., from 120° C. to 175° ° C., from 120° C. to 150° C., from 150° C. to 175° C., from 165° C. to 185° C., from 130° C. to 140° C., or from 110° C. to 130° C.).

The methods further comprise flowing the mixture through the reaction vessel, wherein the metal particle precursor is reduced within the reaction vessel, thereby forming the plurality of metal particles. The mixture can, for example, be flowed through the reaction vessel at a flow rate of 1 $cm^3 h^{-1}$ or more (e.g., 1.5 $cm^3 h^{-1}$ or more, 2 $cm^3 h^{-1}$ or more, 2.5 $cm^3 h^{-1}$ or more, 3 $cm^3 h^{-1}$ or more, 3.5 $cm^3 h^{-1}$ or more, 4 $cm^3 h^{-1}$ or more, 4.5 $cm^3 h^{-1}$ or more, 5 $cm^3 h^{-1}$ or more, 5.5 cm$^3$ h$^{-1}$ or more, 6 cm$^3$ h$^{-1}$ or more. 6.5 cm$^3$ h$^{-1}$ or more, 7 cm$^3$ h$^{-1}$ or more, 7.5 cm$^3$ h$^{-1}$ or more, 8 cm$^3$ h$^{-1}$ or more, 8.5 cm$^3$ h$^{-1}$ or more, 9 cm$^3$ h$^{-1}$ or more, 9.5 cm$^3$ h$^{-1}$ or more, 10 cm$^3$ h$^{-1}$ or more, 11 cm h$^{-1}$ or more, 12 cm$^3$ h$^{-1}$ or more, 13 cm$^3$ h$^{-1}$ or more, 14 cm$^3$ h$^{-1}$ or more, 15 cm$^3$ h$^{-1}$ or more, 20 cm$^3$ h$^{-1}$ or more, 25 cm$^3$ h$^{-1}$ or more, 30 cm$^3$ h$^{-1}$ or more, 35 cm$^3$ h$^{-1}$ or more, 40 cm$^3$ h$^{-1}$ or more, or 45 cm$^3$ h$^{-1}$ or more). In some examples, the mixture can be flowed through the reaction vessel at a flow rate of 50 cm$^3$ h$^{-1}$ or less (e.g., 45 cm$^3$ h$^{-1}$ or less, 40 cm$^3$ h$^{-1}$ or less, 35 cm$^3$ h$^{-1}$ or less, 30 cm$^3$ h$^{-1}$ or less, 25 cm$^3$ h$^{-1}$ or less, 20 cm$^3$ h$^{-1}$ or less, 15 cm$^3$ h$^{-1}$ or less, 14 cm$^3$ h$^{-1}$ or less, 13 cm$^3$ h$^1$ or less, 12 cm$^3$ h$^{-1}$ or less, 11 cm$^3$ h$^{-1}$ or less, 10 cm$^3$ h$^{-1}$ or less, 9.5 cm$^3$ h$^{-1}$ or less, 9 cm$^3$ h$^{-1}$ or less, 8.5 cm$^3$ h$^{-1}$ or less, 8 cm$^3$ h$^{-1}$ or less, 7.5 cm$^3$ h$^{-1}$ or less, 7 cm$^3$ h$^{-1}$ or less, 6.5 cm$^3$ h$^{-1}$ or less, 6 cm$^3$ h$^{-1}$ or less, 5.5 cm$^3$ h$^{-1}$ or less, 5 cm$^3$ h$^{-1}$ or less, 4.5 cm$^3$ h$^{-1}$ or less, 4 cm$^3$ h$^{-1}$ or less, 3.5 cm$^3$ h$^{-1}$ or less, 3 cm$^3$ h$^{-1}$ or less, 2.5 cm$^3$ h$^{-1}$ or less, 2 cm$^3$ h$^{-1}$ or less, or 1.5 cm$^3$ h$^{-1}$ or less). The flow rate that the mixture is flowed through the reaction vessel at can range from any of the minimum values described above to any of the maximum values described above. For example, the mixture can be flowed through the reaction vessel at a flow rate of from 1 cm$^3$ h$^{-1}$ to 50 cm$^3$ h$^{-1}$ (e.g., from 1 cm$^3$ h$^{-1}$ to 25 cm$^3$ h$^{-1}$, from 25 cm$^3$ h$^{-1}$ to 50 cm$^3$ h$^{-1}$, from 1 cm$^3$ h$^{-1}$ to 10 cm$^3$ h$^{-1}$, from 10 cm$^3$ h$^{-1}$ to 20 cm$^3$ h$^{-1}$, from 20 cm$^3$ h$^{-1}$ to 30 cm$^3$ h$^{-1}$ from 30 cm$^3$ h$^{-1}$ to 40 cm$^3$ h$^{-1}$, from 40 cm$^3$ h$^{-1}$ to 50 cm$^3$ h$^{-1}$, from 5 cm$^3$ h$^{-1}$ to 40 cm$^3$ h$^{-1}$, or from 7.5 cm$^3$ h$^{-1}$ to 30 cm$^3$ h$^{-1}$).

In some example, the mixture has a residence time within the reaction vessel of 35 minutes or less (e.g., 30 minutes or less, 25 minutes or less, 20 minutes or less, 19 minutes or less, 18 minutes or less, 17 minutes or less, 16 minutes or less, 15 minutes or less, 14 minutes or less, 13 minutes or less, 12 minutes or less, 11 minutes or less, 10 minutes or less, 9.5 minutes or less, 9 minutes or less, 8.5 minutes or less, 8 minutes or less, 7.5 minutes or less, 7 minutes or less, 6.5 minutes or less, 6 minutes or less, 5.5 minutes or less, 5 minutes or less, 4.5 minutes or less, 4 minutes or less, 3.5 minutes or less, 3 minutes or less, 2.5 minutes or less, 2 minutes or less, 1.5 minutes or less, or 1 minutes or less).

The plurality of metal particles can, for example, comprise a metal selected from the group consisting of Ru, Rh, Pd, Pt, Au, Ag, Os, Ir, and combinations thereof. In some examples, the plurality of metal particles comprise a metal selected from the group consisting of Rh, Ag, and combinations thereof. In some examples, the plurality of metal particles comprise a single metal. In some examples, the plurality of metal particles comprise a mixture of two metals. In some example, the plurality of metal particles can comprise a plurality of Rh particles, a plurality of Rh—Ag alloy particles, or a combination thereof.

In some examples, the plurality of metal particles comprise a mixture of two metals and the two metals are provided at a ratio of 1:99 or more (e.g., 1:95 or more, 1:90 or more, 1:85 or more, 1:80 or more, 1:75 or more, 1:70 or more, 1:65 or more, 1:60 or more, 1:55 or more, 1:50 or more, 1:45 or more, 1:40 or more, 1:35 or more, 1:30 or more, 1:25 or more, 1:20 or more, 1:15 or more, 1:10 or more, 1:9 or more, 1:8 or more, 1:7 or more, 1:6 or more, 1:5 or more, 1:4 or more, 1:3 or more, 1:2 or more, 1:1 or more, 2:1 or more, 3:1 or more, 4:1 or more, 5:1 or more, 6:1 or more, 7:1 or more, 8:1 or more, 9:1 or more, 10:1 or more, 15:1 or more, 20:1 or more, 25:1 or more, 30:1 or more, 35:1 or more, 40:1 or more, 45:1 or more, 50:1 or more, 55:1 or more, 60:1 or more, 65:1 or more, 70:1 or more, 75:1 or more, 80:1 or more, 85:1 or more, 90:1 or more, or 95:1 or more).

In some examples, the plurality of metal particles comprise a mixture of two metals and the two metals are provided at a ratio of 99:1 or less (e.g., 95:1 or less, 90:1 or less, 85:1 or less, 80:1 or less, 75:1 or less, 70:1 or less, 65:1 or less, 60:1 or less, 55:1 or less, 50:1 or less, 45:1 or less, 40:1 or less, 35:1 or less, 30:1 or less, 25:1 or less, 20:1 or less, 15:1 or less, 10:1 or less, 9:1 or less, 8:1 or less, 7:1 or less, 6:1 or less, 5:1 or less, 4:1 or less, 3:1 or less, 2:1 or less, 1:1 or less, 1:2 or less, 1:3 or less, 1:4 or less, 1:5 or less, 1:6 or less, 1:7 or less, 1:8 or less, 1:9 or less, 1:10 or less, 1:15 or less, 1:20 or less, 1:25 or less, 1:30 or less, 1:35 or less, 1:40 or less, 1:45 or less, 1:50 or less, 1:55 or less, 1:60 or less, 1:65 or less, 1:70 or less, 1:75 or less, 1:80 or less, 1:85 or less, 1:90 or less, or 1:95 or less).

The molar ratio of the two metals when the plurality of metal particles comprise a mixture of two metals can range from any of the minimum values described above to any of the maximum values described above. For example, the plurality of metal particles can comprise a mixture of two metals and the two metals can be provided at a ratio of from 1:99 to 99:1 (e.g., from 1:99 to 1:1, from 1:1 to 99:1, from 1:99 to 1:50, from 1:50 to 1:1, from 1:1 to 50:1, from 50:1 to 99:1, from 70:30 to 30:70, or from 1:10 to 10:1).

The plurality of metal particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.) For an anisotropic particle, the average particle size can refer to, for example, the hydrodynamic size of the particle. Mean particle size can be measured using methods known in the art, such as evaluation by scanning electron microscopy, transmission electron microscopy, and/or dynamic light scattering.

The plurality of metal particles have, for example, an average particle size of 1 nm or more (e.g., 1.25 nm or more, 1.5 nm or more, 1.75 nm or more, 2 nm or more, 2.25 nm or more, 2.5 nm or more, 2.75 nm or more, 3 nm or more, 3.25 nm or more, 3.5 nm or more, 3.75 nm or more, 4 nm or more, 4.25 nm or more, 4.5 nm or more, 4.75 nm or more, 5 nm or more, 5.5 nm or more, 6 nm or more, 6.5 nm or more, 7 nm or more, 7.5 nm or more, 8 nm or more, 8.5 nm or more, 9 nm or more, 9.5 nm or more, 10 nm or more, 11 nm or more. 12 nm or more, 13 nm or more, 14 nm or more, 15 nm or more, 16 nm or more, 17 nm or more, 18 nm or more, or 19 nm or more). In some example, the plurality of metal particles can have an average particle size of 20 nm or less (e.g., 19 nm or less, 18 nm or less, 17 nm or less, 16 nm or less, 15 nm or less, 14 nm or less, 13 nm or less, 12 nm or less, 11 nm or less, 10 nm or less, 9.5 nm or less, 9 nm or less, 8.5 nm or less, 8 run or less, 7.5 nm or less, 7 nm or less, 6.5 nm or less, 6 nm or less, 5.5 nm or less, 5 nm or less, 4.75 nm or less, 4.5 nm or less, 4.25 nm or less, 4 nm or less, 3.75 nm or less, 3.5 nm or less, 3.25 nm or less, 3 nm or less, 2.75 nm or less, 2.5 nm or less, 2.25 nm or less, 2 nm or less, 1.75 nm or less, or 1.5 nm or less). The average particle size of the plurality of metal particles can range from any of the minimum values described above to any of the maximum values described above. For example, the plurality of metal particles can have an average particle size of from 1 nm to 20 nm (e.g., from 1 nm to 10 nm, from 10 nm to 20 nm, from 1 nm to 4 nm, from 4 nm to 8 nm, from 8 nm to 12 nm, from 12 nm to 16 nm, from 16 nm to 20 nm, from 1 nm to 12 nm, or from 1 nm to 5 nm).

In some examples, the plurality of metal particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the mean particle size (e.g., within 20% of the mean particle size, within 15% of the mean particle size, within 10% of the mean particle size, or within 5% of the mean particle size).

The plurality of metal particles can comprise particles of any shape (e.g., a sphere, a rod, a quadrilateral, an ellipse, a triangle, a polygon, etc.). In some examples, the plurality of metal particles can have an isotropic shape. In some examples, the plurality of metal particles can have an anisotropic shape. In some examples, the plurality of metal particles are substantially cuboctahedral in shape.

The plurality of metal particles can, for example, further comprise a capping layer comprising the capping material such that the plurality of metal particles comprise a plurality of capped metal particles. Suitable capping materials for capping layers for metal particles are known in the art. "Capping" refers to the formation of an ionic or covalent bond of molecules to the surface atoms of a particle, this molecule is referred to as a capping agent. "Capping material" refers to a molecule possessing a functional group capable of binding to the surface atoms of a particle by ionic or covalent bond. Such capping materials usually contain functional groups such as thiol (—SH), carboxyl (—COOH), or amine (—NH) groups. The capping materials can uniformly cover the surface of each of the plurality of metal particles, thereby forming the capping layer on the surface of each of the plurality of metal particles to form the plurality of capped metal particles. The capping material can be used to stabilize the plurality of metal particles. The capping material can, for example, prevent the oxidation on the surface of the plurality of metal particles and/or to increase the dispersibility of the plurality of metal particles.

In some examples, the capping material can be attached to the surface of each of the plurality of metal particles, for example, by coordination bonds. The capping material can also be associated with the plurality of metal particles via non-covalent interactions. In some examples, the capping material can individually be selected to be a hydrophilic, hydrophobic, or amphiphilic. In addition, the capping material can, in combination, be selected so as to provide a shell surrounding each of the plurality of metal particles which is hydrophilic, hydrophobic, or amphiphilic.

Examples of capping materials include, but are not limited to, citrate, tannic acid, lipoic acid, dodecane thiol, cetrimonium bromide (CTAB), cetrimonium chloride (CTAC), branched polyethylenimine (BPEI), polyethylene glycol (PEG), polyvinylpyrrolidone (PVP), sodium dodecyl sulfate (SDS), or combinations thereof. In some examples, the capping material is selected from the group consisting of citrate, cetrimonium bromide (CTAB), cetrimonium chloride (CTAC), polyethylene glycol (PEG), polyvinylpyrrolidone (PVP), sodium dodecyl sulfate (SDS), and combinations thereof. In some examples, the capping material comprises polyvinylpyrrolidone (PVP).

The methods further comprise collecting the plurality of metal particles from the outlet of the continuous flow microwave reactor. The plurality of metal particles can be collected in any manner chosen by the formulator, for example, the plurality of metal particles can be collected by centrifugation, filtration, or decanting.

In some examples, the methods described herein can continuously produce a plurality of metal particles. For example, the metal particle precursor, reducing agent, and capping material can be repeatedly or continuously injected into the inlet of the continuous flow microwave reactor and the plurality of metal particles can be repeatedly or continuously collected at the outlet of the continuous flow microwave reactor.

In some example, the methods can produce the plurality of metal particles at a rate of 20 mg/hour or more (e.g., 30 mg/hour or more, 40 mg/hour or more, 50 mg/hour or more, 60 mg/hour or more, 70 mg/hour or more, 80 mg/hour or more, 90 mg/hour or more, 100 mg/hour or more, 150 mg/hour or more, 200 mg/hour or more, 250 mg/hour or more, 300 mg/hour or more, 350 mg/hour or more, 400 mg/hour or more, 450 mg/hour or more, or 500 mg/hour or more).

Also disclosed herein are methods of making a supported catalyst, the methods comprising dispersing the plurality of metal particle made by the methods described herein onto a support material. The support material can, for example, comprise $SiO_2$.

Also disclosed herein are catalysts comprising the plurality of metal particles made by any of the methods described herein. Also disclosed herein are methods of use of the catalysts, the catalyst being used to catalyze a coupling reaction. Examples of coupling reactions include, but are not limited to the Sonogashira reaction and the Suzuki Reaction. Also disclosed herein are methods of use of the catalysts, the catalyst being used to catalyze a hydrosilation, reduction/oxidation, cyclization, or hydrogenation reaction A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Batch-type syntheses of colloidal metallic nanoparticles are extremely sensitive to heat and mass transport limitations, which become increasingly problematic for larger reactor volumes and/or higher reagent concentrations (Tao A R et al. *Small*, 2008, 4, 310-325). These scaling issues negatively influence nucleation and growth and result in lower monodispersity, inferior process reproducibility, and morphological inconsistency. One solution to this problem is to conduct multiple, parallel syntheses using established lab-scale batch chemistries, but in a continuous flow arrangement. Flow chemistry conducted in micro- or millifluidic channels provides excellent control over heat and mass transport. Thus, large quantities of products can be obtained without compromising the quality of products (Chen J et al. *Langmuir*, 2007, 23, 4120-4129; Niu G et al. *Nano lett.* 2016, 16, 3850-3857).

Micro- and milli-fluidic continuous flow strategies for the synthesis of nanoparticles include single-phase flow approaches, in which the reactants are simply mixed and flowed through narrow (typically <1 mm diameter) tubing or micro-machined channels at a controlled temperature and residence time (Chan E M et al., *Nano Lett.*, 2003, 3, 199-201; Lin X Z et al. *Nano Lett* 2004, 4, 2227-2232; Back J et al. *Angew. Chem. Int. Ed.* 2011, 50, 653-656). These single-phase flow approaches hold clear advantages for bulk scale-up by ensuring efficient heat transfer and uniform conditions at any given point in the reactor.

Microwave irradiation ($\mu$wI) has previously been used to synthesize monometallic and bimetallic noble metal nanoparticles and some important synthetic benefits of microwave irradiation over conventional heating (CvH) were demonstrated (Dahal N et al. *ACS Nano* 2012, 6, 9433-9446; Garcia S et al. *ACS Nano* 2014, 8, 11512-11521; Garcia S et al. *Chem. Commun.* 2013, 49, 4241-4243; Garcia S et al. *Inorg. Chim. Acta* 2014, 422, 65-69). For example, it was shown that the synthesis of Pd, Pt, or Rh nanoparticles prepared under microwave irradiation enabled improved monodispersity and morphological control. These desirable effects were ascribed to faster and more reproducible metallic nanoparticle nucleation events, facilitated at short-lived, nanosized 'hotspots' that are generated by strong rotational coupling of microwaves with polar solvents and ionic precursors, followed by fast localized energy dissipation. An ongoing research goals is to develop reaction systems wherein the continuous flow synthesis of colloidal metallic nanoparticle catalysts can be conveniently coupled with the use of microwave irradiation. Performing metallic nanoparticle synthesis under continuous flow conditions has the potential to solve the aforementioned issues of throughput and scalability. A number of different types of monodisperse inorganic nanoparticles can be produced in increased yields as a result of the superior heat and mass transport inherent to the high surface area-to-volume dimensions of micro- and millifluidic channels (Riche C T et al. *Nat. Commun.*, 2016, 7, 1-7; Kunal P et al. *ACS Catal.*, 2016, 6, 4882-4893; Lazarus L L et al. *Lab on a Chip* 2010, 10, 3377-3379; Roberts E J et al. *ACS Sustainable Chemistry & Engineering* 2017, 5, 632-639). Moreover, unlike traditional batch processes, continuous flow methods are highly amenable to automation, which affords improved product fidelity and higher throughput. Scale-up can be further enhanced by reaction parallelization, since the local reaction conditions are invariant in terms of mixing uniformity and temperature distribution (Riche C T et al. *Nat. Commun.*, 2016, 7, 1-7; Nightingale A M et al. *J. Mater. Chem. A*, 2013, 1, 4067-4076).

The pursuit of scalable methods for the preparation of well-defined metallic nanoparticles (MNPs) is addressed herein via a microwave-assisted continuous-flow synthesis technique. Single-phase flow synthesis methods provide access to morphologically well-defined and near-monodisperse Rh nanoparticles. Single-phase continuous flow reactions led to monodisperse cuboctahedral metallic nanoparticles, which directly mirrors the outcome of the previously studied batch reactions. However, the Rh nanoparticles can be prepared in shorter reaction times and at lower temperatures than are commonly required in conventional batch reactions. Under single-phase flow conditions, in which Rh(III) is reduced in ethylene glycol, near-monodisperse cuboctahedral Rh nanoparticles are obtained; the average nanoparticle size can be controlled as a function of the residence time of the reactant stream within the microwave cavity.

Apparatus, Methods and Characterization.

$RhCl_3 \cdot xH_2O$ (38-41%, Strem) $AgNO_3$ (99.9+%, Alfa Aesar), polyvinylpyrrolidone (PVP) (M.W.=58000, Alfa Aesar), Ethylene glycol (EG) (Certified, Fisher), and Fluorinert FC-40 (Sigma-Aldrich) were used as received. MARS 5 microwave system (CEM Corp.) operating with fiber-optic temperature feedback control (±0.1° C.) and a maximum controllable power of up to 1600 W was used to carry out all the microwave irradiation assisted synthesis reactions. The reaction temperature values during these syntheses were controlled using a RTP-300+ fiber-optic temperature sensor. Conventional heating assisted reactions were carried out in silicone oil (Fisher) baths. Single phase flow reactions were performed using polytetrafluoroethylene (PTFE) tubing (inner diameter (ID)=0.79 mm; outer diameter (OD)=1.59 mm; McMaster-Carr). Precursor addition rate was controlled using a programmable syringe pump (WPI Inc.). Different lengths of the PTFE tubing and syringe pump addition rates were used during single phase flow reactions in order to achieve various residence times. Control reactions were performed under reaction conditions identical to flow reactions but using a stirring speed of 450 rpm wherever applicable.

Synthesis of Rh Nanoparticles Under Single Phase Flow Synthesis Conditions.

Separately, $RhCl_3 \cdot xH_2O$ (19.3 mg) and PVP (200 mg) were each dissolved in ethylene glycol (6.1 mL) using a bath sonicator at room temperature and then combined. This solution was injected at 30 $cm^3$ $h^{-1}$ into 30.5 m of PTFE tubing (residence time=35 min). Residence times were modified by varying the flow rate and tubing length (Table 1). Reaction products were collected in a 50 mL polypropylene centrifuge tube submerged in an ice-water bath. Resulting nanoparticles (NPs) were purified by two cycles of dissolution and precipitation followed by ultracentrifugation at 5500 rpm for 5 min. Acetone (20-50 mL, 5× of the starting volume of the reaction product) was added to the collected reaction product and the resulting mixture was briefly vortexed to induce complete precipitation of the nanoparticles followed by ultracentrifugation using the aforementioned conditions. A second purification cycle was performed via redispersion of the nanoparticles in ethanol (4-10 mL) using a bath sonicator; hexanes (20-40 mL) was then added to induce reprecipitation, followed by isolation by ultracentrifugation. The resulting nanoparticles were stored in centrifuge tubes as dry polymer film at the room temperature.

TABLE 1

Reaction parameters for flow reactions carried out under microwave irradiation.

| Flow Mode | Flow Rate (cm$^3$h$^{-1}$) | Length of Tubing (m) | Residence Time (min) |
|---|---|---|---|
| Single-phase | 30 | 7.6 | 9 |
| Single-phase | 30 | 3.8 | 4.6 |
| Single-phase | 15 | 7.6 | 18 |
| Single-phase | 7.5 | 7.6 | 35 |

Batch Synthesis.

Analogous bath reactions were performed using solutions identical to the flow reactions and stirred at 450 rpm in a 50 mL round bottom flask.

Synthesis of Catalysts.

Using a 20 mL scintillation vial, PVP-capped Rh nanoparticles (5-8 mg) were supported on 60 mg of amorphous pre-calcined silica in a solvent mixture of ethanol and DI water. Typically, nanoparticles were dispersed in 5 mL EtOH and 4 mL of DI water was added to it. This solution was sonicated for 15 minutes to ensure a homogeneous solution of nanoparticles. A dispersion of amorphous silica in ethanol was prepared by taking 60 mg of silica in a 20 ml glass scintillation vial equipped with a mini-stir bar and adding 5 ml of DI water and 4 mL of ethanol to it. This mixture was sonicated for at least 30 min and constantly stirred while adding the nanoparticles solution to it in a drop wise fashion. The resulting mixture was subjected to three purification cycles consisting of stirring for 10 min followed by sonication; the catalysts were then isolated by filtration and washed with copious amounts of water and ethanol. The resulting solids were dried in an oven at 70° C. for 12 h, resulting in gray colored amorphous-SiO$_2$-supported nanoparticle catalysts.

Characterization.

Powder X-ray diffraction (PXRD) data were recorded using a Spider diffractometer (Rigaku Corporation) equipped with a Cu Ku source (wavelength of 1.5418 Å) operated at 40 kV and 40 mA. Transmission electron microscopy (TEM) samples were prepared by dispersing nanoparticles in ethanol and drop-casting the solution onto 200 mesh copper Formvar grids (Ted Pella Inc.) and completely drying the samples in air. The size of the analyzed particles were manually measured using Image-J (http://rsbweb.nih.gov/ij). Low resolution TEM images were acquired using a FEI Tecnai Transmission Electron Microscope. High resolution TEM (HRTEM) images, high-angle annular dark field scanning transmission electron microscopy (HAADF-STEM) images, and energy dispersive X-ray spectroscopy (EDS) spectra were acquired using a JEOL 2010F TEM equipped with an Oxford EDS detector. The instrument was operated at 200 keV with a 0.19 nm point to point resolution. Lattice spacing values were calculated using fast Fourier transform (FFT) and averaged from at least 2 measurements. Inductively coupled plasma mass spectrometry (ICP-MS) data were obtained using an Agilent 7500ce ICP-Q-MS spectrometer.

Catalytic Studies.

Catalytic mixture was made by mixing SiO$_2$-nanoparticle (1-2 mg) with acid treated calcined sand (110-120 mg) and loaded onto a D$_3$-porosity frit in a custom made quartz U-tube. This catalytic mixture was maintained at 25° C. using a water bath powered by a ThermoFisher Scientific ThermoFlex 1400 recirculating chiller. First, the catalyst was activated by purging with a 1:1 mixture of reactant gases (H$_2$ and He) for 30 mins. Then cyclohexene was introduced into the catalysis line via an in-line saturator. Real time percentage conversion of cyclohexene to cyclohexane was monitored using an HP Agilent 6890 GC with a Restex Stabiliwax 15 m column and equipped with tandem flame ionization detector (FID) and thermal conductivity detector (TCD).

Kinetic Studies and Determination of Activation Energies.

The catalytic run was started at 25° C. and temperature was changed to 30° C. after attainment of steady state conversion of cyclohexene to cyclohexane at 25° ° C. Temperature was held constant at 30° C. until the steady state was achieved again. This process was repeated for temperature values of 24, 18, 12, and 6° C. respectively. The activation energy values were obtained using the slope of the best fit line by plotting Ln(activity) vs. (1/T(K)). The activity values were averaged using at least four points corresponding to steady state of the catalysts.

Synthesis of Rh Nanoparticles by Single-Phase Flow.

The synthesis of Rh nanoparticles under single-phase continuous flow conditions under microwave irradiation-assisted heating was investigated. A syringe pump was used to achieve a constant flow rate of reactants and solvent through PTFE tubing (ID=0.79 mm). Nucleation was triggered by the introduction of the reactant stream into the microwave irradiation cavity; the solvent was held at constant temperature by continually varying the power input from the magnetron, controlled via a fiber-optic temperature probe. RhCl$_3$.xH$_2$O was used as the Rh precursor, poly (vinylpyrrolidone) (PVP) was used as the capping agent, and ethylene glycol (EG) was used as the solvent and reducing agent for all syntheses.

First, the suitability of PTFE tubing for the microwave-assisted formation of Rh nanoparticles was assessed under continuous flow conditions. A single-phase solution of RhCl$_3$.xH$_2$O and PVP dissolved in ethylene glycol was flowed through the microwave cavity at a reaction temperature of 120° C. The residence time in the microwave cavity was set to 35 min (Table 1) so as to directly emulate the reaction conditions from the previously established batch reactions (Dahal N et al. ACS Nano 2012, 6, 9433-9446). This did not lead to any color change of the precursor solution that would be indicative of Rh(III) reduction and Rh nanoparticle nucleation. Attempts to collect isolable products using a precipitating solvent (e.g., acetone) also failed. Increasing the maximum microwave irradiation power to a constant 1600 W and increasing the residence times also failed to achieve precursor reduction. Reduction of RhCl$_3$.xH$_2$O was eventually achieved by immersion of the coil of PTFE tubing directly into a secondary ethylene glycol solvent bath, also at 120° C. (FIG. 1). These combined observations suggested that dipolar coupling of microwaves to the polar solvent and the ionic precursor species inside the tubing was prevented by the tubing material itself, and/or that heat dissipation from the narrow tubing was so rapid that the necessary reduction temperature could not be reached. By comparison, reduction can be achieved at bulk ethylene glycol temperatures ≤100° C. for stirred precursor solutions in borosilicate glassware at ambient pressure. In this case, the addition of an external ethylene glycol bath increased the effective microwave absorption volume without compromising the advantages of being able to conduct the metallic nanoparticle synthesis under continuous flow.

Figure 2:
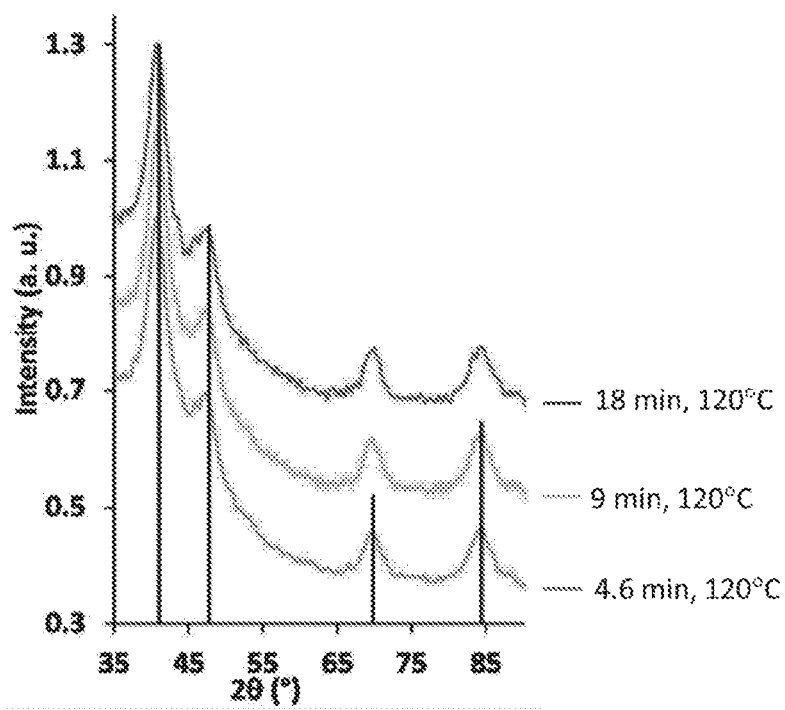
FIG. 2 is the PXRD patterns of Rh nanoparticles synthesized using one-phase flow under microwave irradiation at 120° C. in 4.6 min, 9 min, and 18 min.
Figure 3:
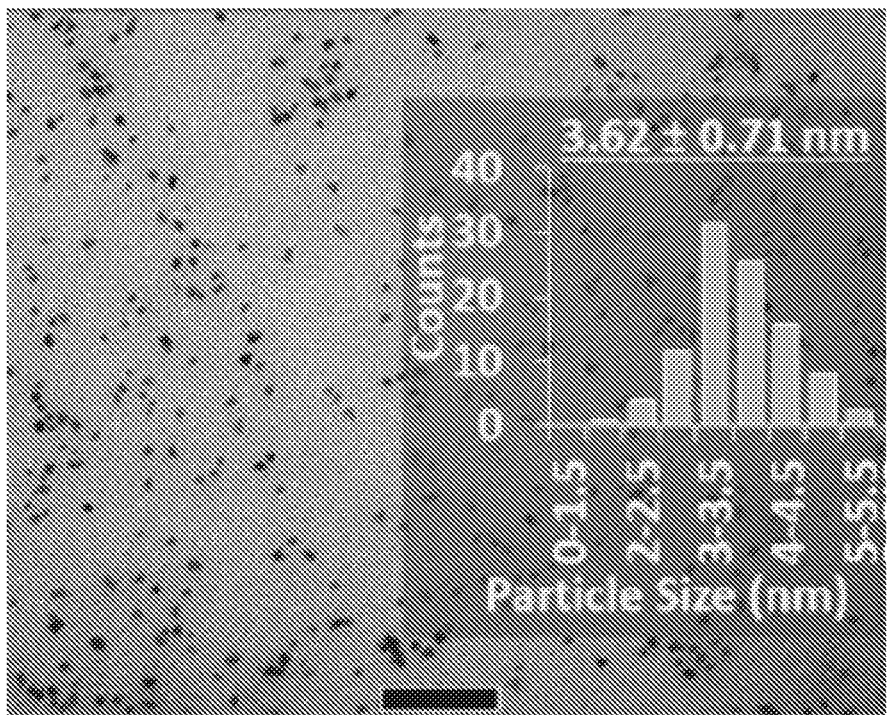
FIG. 3 is a TEM image of Rh nanoparticles synthesized in 9 min; particle size distributions and average size values are shown in the insert. Scale bar: 50 nm.

Next, a single-phase mixture of $RhCl_3 \cdot xH_2O$ and PVP was co-dissolved in ethylene glycol and flowed through the PTFE tubing submerged in the ethylene glycol bath at 120° C. Upon exiting the microwave cavity, the products were collected in a centrifuge tube that was pre-chilled in an ice-water bath to quench further reaction. Purification of the products was carried out by precipitation by addition of excess acetone, followed by ultracentrifugation. Re-dispersion of the Rh nanoparticles into ethanol followed by re-precipitation using excess hexanes removed all excess PVP. Powder X-ray diffraction (PXRD) analysis of the resulting nanoparticle products revealed diffraction maxima that were well-matched with the reflections corresponding to bulk FCC-Rh (observed lattice parameter, a=3.80 Å; FIG. 2) (Ziegelbauer J M et al. *Electrochim. Acta*, 2007, 52, 6282-6294). Scherrer analysis of the PXRD patterns obtained for the Rh nanoparticles suggested an average grain size of 3.16 nm. In support of this observation, transmission electron microscopy (TEM) analysis revealed well-defined cuboctahedral Rh nanoparticles with a mean diameter of 3.62±0.71 nm (FIG. 3).

Figure 4:
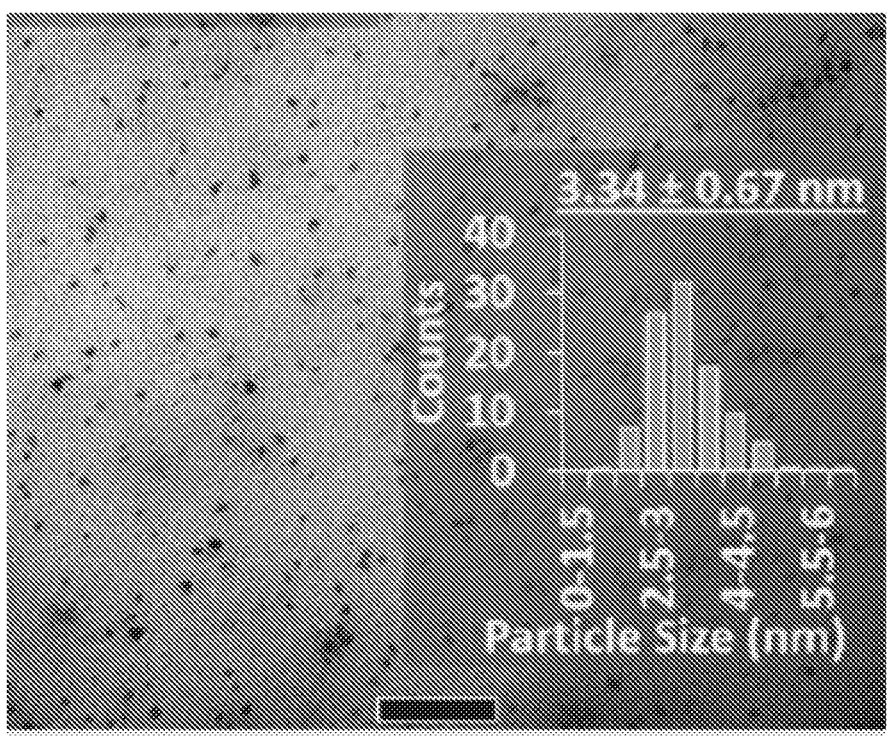
FIG. 4 is a TEM image of Rh nanoparticles synthesized in 4.6 min; particle size distributions and average size values are shown in the insert. Scale bar: 50 nm.
Figure 5:
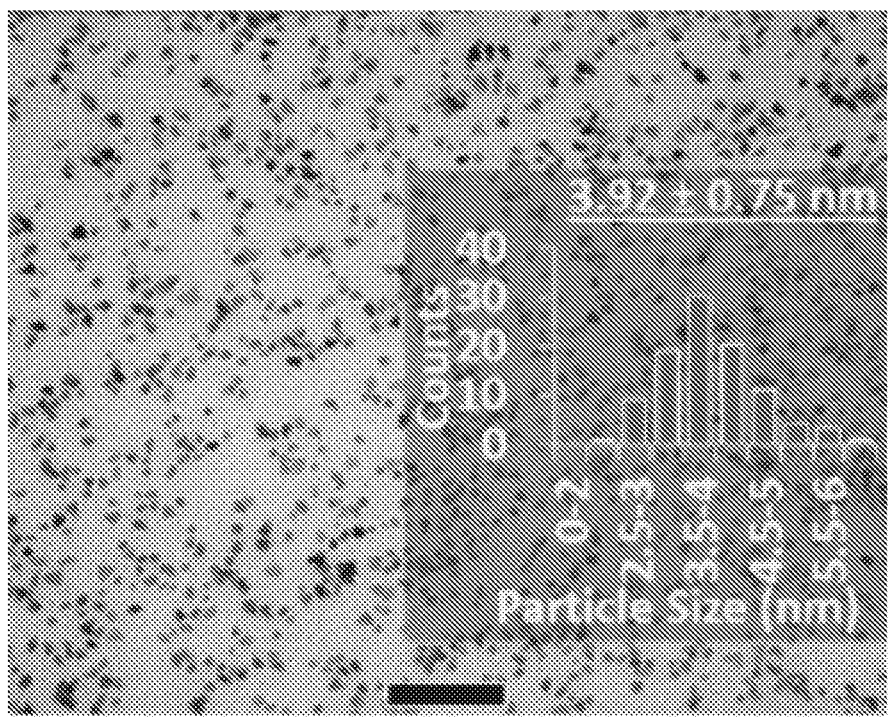
FIG. 5 is a TEM image of Rh nanoparticles synthesized in 18 min; particle size distributions and average size values are shown in the insert. Scale bar: 50 nm.
Figure 6:
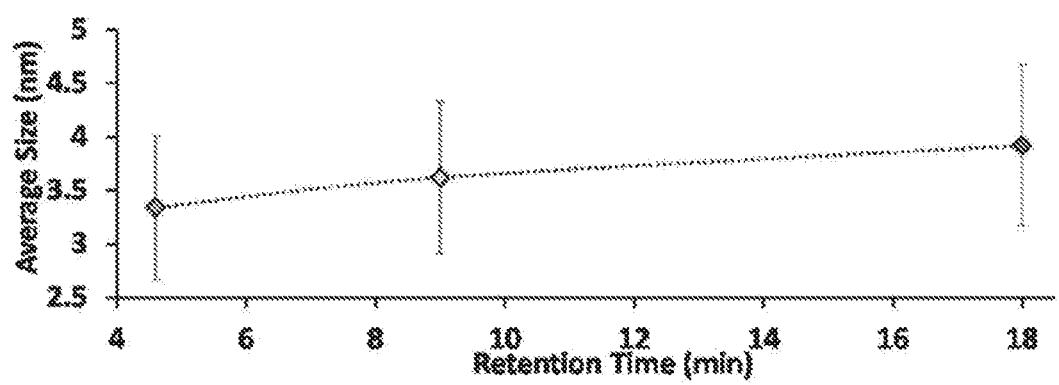
FIG. 6 is a plot of average size measurements derived from TEM analysis and reaction time; error bars represent standard deviation of the measurements.

In order to study the effects of residence time upon Rh nanoparticle size and morphology, the flow rates and tubing length were systematically changed while keeping the concentrations of $RhCl_3 \cdot xH_2O$ and PVP constant, as described in Table 1. As shown in FIG. 4 the average Rh nanoparticle diameter (3.34±0.67 nm) was decreased upon using a shorter residence time of 4.6 main, while there were no obvious morphological differences. In accordance with this observation, when the residence time was increased to 18 min, slightly larger Rh nanoparticles with a mean diameter of 3.92±0.75 nm were obtained, while monodispersity and morphology remained unaffected (FIG. 5). It is perhaps not surprising that Rh nanoparticle size was increased as a function of microwave irradiation residence time under single-phase continuous flow conditions (FIG. 6), because nanoparticle ripening in solution is usually accelerated by heating. More importantly, the Rh nanoparticles obtained under continuous flow conditions were as highly monodisperse and morphologically well-defined as those obtained previously in analogous batch reactions, yet the reactions could be conducted in significantly shorter times (4.6 min vs. 35 min) and at lower temperature (120° C. vs. 150° C.).

Figure 7:
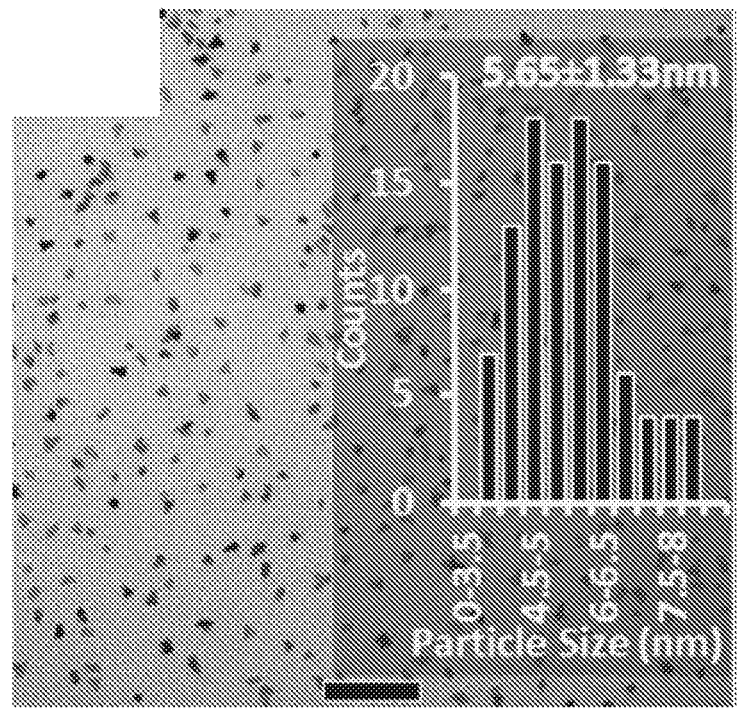
FIG. 7 is a TEM image of Rh nanoparticles isolated from control batch reaction carried out under microwave irradiation at 120° C. for 9 minutes while not using a syringe pump.
Figure 8:
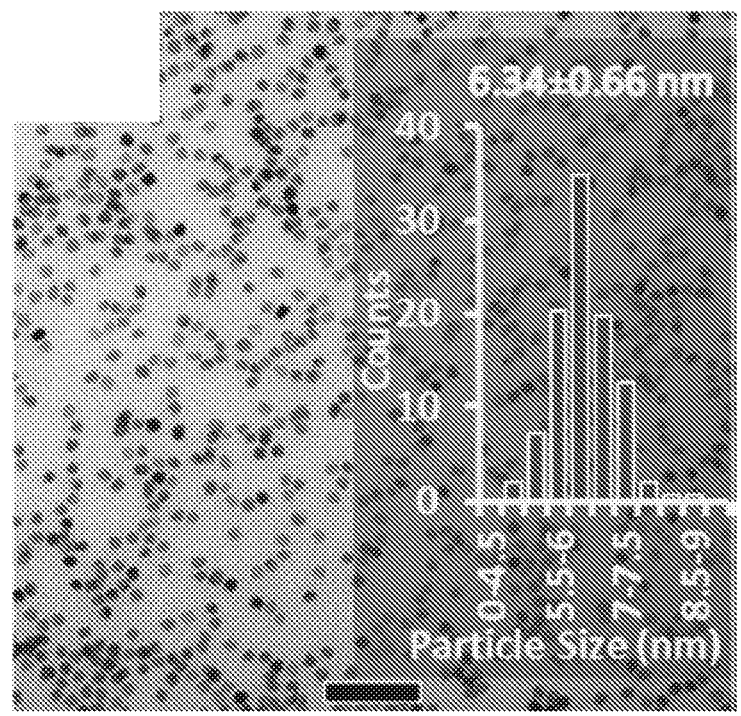
FIG. 8 is a TEM image of Rh nanoparticles isolated from control reaction carried out under microwave irradiation at 120° C. for 9 minutes and adding $RhCl_3 \cdot xH_2O$ and PVP dissolved in ethylene glycol injected using separate syringes.
Figure 9:
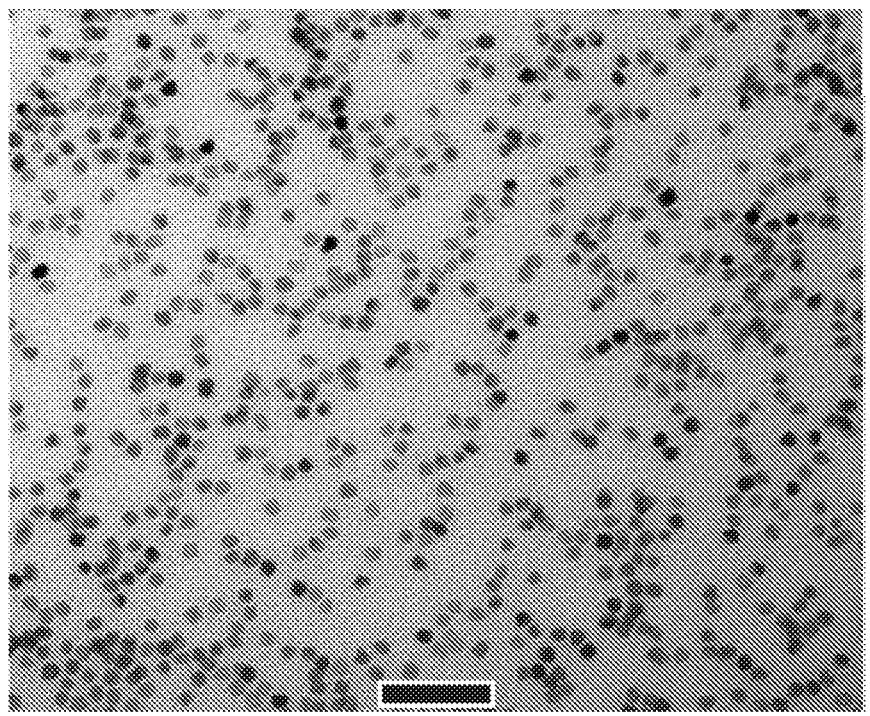
FIG. 9 is a TEM image of Rh nanocubes synthesized in bath by injecting $RhCl_3 \cdot xH_2O$ and PVP using two separate syringe pumps. Scale bar: 50 nm.

The results were also compared with the products obtained from otherwise identical reactions conducted with microwave irradiation in isolated batch reactions. In these reactions, the stirred mixtures turned dark after 1-2 min, indicating successful reduction of Rh(III) precursors at 120° C. TEM analysis of the products after heating for 9 min revealed that 31% of the Rh nanoparticles had poorly-defined anisotropic morphologies, while the majority of Rh nanoparticles were a mixture of triangular plates and truncated octahedra with an average size of 5.65±1.33 nm (FIG. 7-FIG. 8). The ratio of intensity values corresponding to (111 and (222) from PXRD analyses for various samples are shown in Table 2. Furthermore, when $RhCl_3 \cdot xH_2O$ and PVP were dissolved separately in ethylene glycol and co-injected into a flask at 120° C. under microwave irradiation using two syringe pumps, a majority of well-defined truncated cubic Rh nanoparticles were obtained after 9 min of heating (6.34±0.66 run; FIG. 9).

TABLE 2

Ratio of intensity values corresponding to 111 and 200 obtained from PXRD analyses.

| Sample | $I_{111}/I_{200}$ |
|---|---|
| Batch reaction; no syringe pump; Rh nanoparticles; microwave irradiation; 120° C.; 9 min | 1.77 |
| Rh nanoparticles; microwave irradiation; 120° C.; 9 min; $RhCl_3 \cdot xH_2O$ and PVP injected using syringe pump | 1.76 |

Assessment of Catalytic Hydrogenation Activity of the Rh Nanoparticles.

The catalytic reactivity and selectivity of Rh nanoparticles are intrinsically governed by surface structure, as well as the ratio of corner and edge sites to face sites. The catalytic runs of the Rh nanoparticle catalysts were performed on-stream in 3.37 min intervals by a gas chromatograph (GC) equipped with an automated injector and twin flame ionization and thermal conductivity detectors (FID-TCD). Each catalyst was studied on-stream for 6 h. Turn over frequency values (TOF; cyclohexane-surface site$^{-1}$ s$^{-1}$) were determined by normalizing raw activity values based on % Rh loading and calculating the fraction of exposed surface atoms to total atoms as a function of the measured average dimensions of the cuboctahedra. Activity was calculated using the following formula:

$$\text{Activity} (\mu mol g^{-1} s^{-1}) = \left(\frac{1}{\text{Mass } os \text{ catalyst used (g)}}\right) *$$

$$\left(\frac{C6H10 \text{ flow (mol/min)} * 10^6}{60 \text{ (s/min)}}\right) * \left(\begin{array}{c}\left(\frac{\text{Area counts for } scyclohexange}{MX \text{ of cyclohexane}}\right) \\ \left(\frac{\text{Area counts for cyclohexane}}{MX \text{ of cyclohexane}}\right) + \\ \left(\frac{\text{Area counts for cyclohexene}}{MX \text{ of cyclohexene}}\right)\end{array}\right)$$

Turnover frequency normalized for Rh loading was calculated using the formula:

$$TOF(S^{-1}) = \left(\frac{\text{Activity} * 10^{-6} (\text{mol}/\mu\text{mol})}{\left(\frac{\text{Wt \% of } Rh}{\text{MW of } Rh}\right)}\right) * \left(\frac{1}{\frac{\text{percentage of}}{\left(\frac{\text{Surface area}}{\text{volume}}\right)} \text{ for the } NPs}\right)$$

Figure 10:
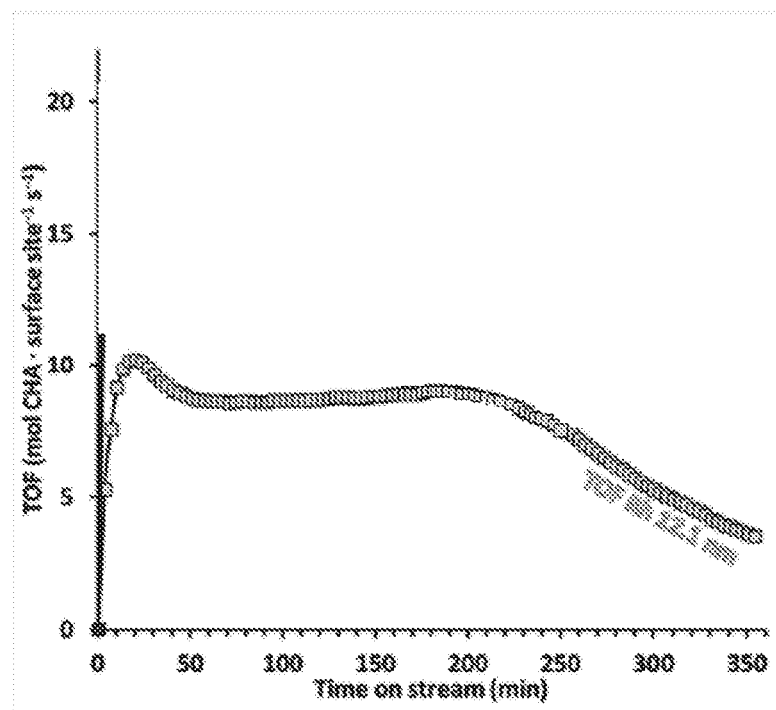
FIG. 10 is a plot of turnover frequency (mol of cyclohexane (CHA) surface area site$^{-1}$ s$^{-1}$) vs. time on stream (min).

As shown in FIG. 10, the 12 nm cuboctahedral Rh nanoparticles exhibited a normalized steady-state-turn over frequency of 3.5 cyclohexane-surface site$^{-1}$s$^{-1}$. The Rh-free amorphous $SiO_2$ supports showed no measurable activity in the same hydrogenation reaction. The steady-state-turn over frequencies observed for the cuboctahedral Rh nanoparticles is a function of the fact that the ratio of Rh surface atoms vs. internal atoms is 0.15 for the 12 nm Rh cuboctahedra.

In this work, the vapor-phase alkene hydrogenation activity of $SiO_2$-supported Rh cuboctahedra obtained from the single-phase continuous flow synthesis was assessed. These were also compared to the catalytic properties of Rh nanoparticles prepared by batch synthesis using otherwise identical synthetic conditions and reagents. The vapor-phase hydrogenation of cyclohexene is a useful model reaction that can be studied to extract important kinetic information (Somorjai G A and Aliaga C. *Langmuir*, 2010, 26, 16190-

16203). In this work, a control catalyst was prepared from a sample consisting of 12 nm Rh cuboctahedra prepared under microwave irradiation from a batch reaction. The as-synthesized Rh nanoparticles were deposited on amorphous $SiO_2$ by simple incipient wetness impregnation, isolated by filtration, washed with ethanol and finally dried in a static oven at 70° C. for 12 h. The composites were used in catalytic studies without harsh pretreatment (e.g., calcination) that could otherwise cause restructuring of the nanoparticle; it is therefore assumed that the capping polymer PVP was still present in each case (Borodko Y et al. *J. Phys. Chem. C*, 2007, 111, 6288-6295; Al-Saidi W A et al. *Nano Lett.* 2012, 12, 997-1001). The use of $SiO_2$ as an inert substrate in this work was chosen to minimize any potential metal-support interactions. TEM analysis of the as-synthesized catalysts supported on amorphous $SiO_2$ did not reveal any discernible particle aggregation or morphological changes (Rh loading, microwave irradiation=1.4 wt %; conventional heating=3.3 wt %; determined by ICP-MS).

Figure 11:
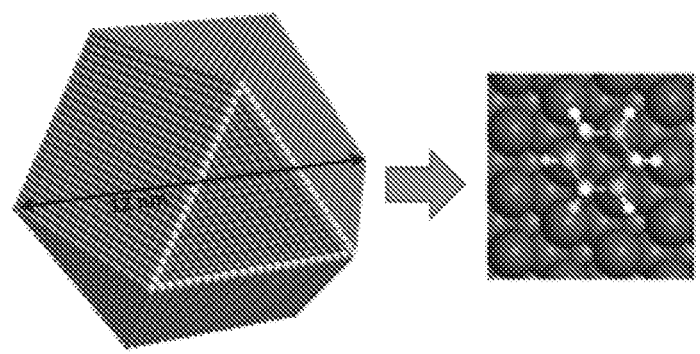
FIG. 11 is a schematic representation of the cuboctahedral for cyclohexene hydrogenation reactions.

The supported catalysts were activated under flowing $H_2$/He at 298 K for 30 min, after which a stream of cyclohexene vapor of known concentration was introduced. Analysis of the post-catalyst effluent mixture showed no measurable activity in the same hydrogenation reaction. The steady-state-turn over frequencies observed for the 12 nm Rh cuboctahedra is a direct function of the fact that the ratio of Rh surface atoms vs. internal atoms is 0.15 (FIG. 11). The measured activation energy (Ea) for the Rh nanoparticle cuboctahedra catalyst was 57.2 kJ mol$^{-1}$, which is in line with previous measurements (Dahal N et al. *ACS Nano* 2012, 6, 9433-9446). The activation energy values were obtained using the slope of the best fit line by plotting Ln (activity) vs. (1/T(K)). The activity values were averaged using at least four points corresponding to steady state of the catalysts.

Theoretical calculations performed previously suggested that desorption of the hydrogenated product, cyclohexane, is in fact the rate-limiting step on a Rh nanoparticle (111) surface (Dahal N et al. *ACS Nano* 2012, 6, 9433-9446). The turn over frequency values may therefore be ascribed to cyclohexane desorption, which is necessary to generate new vacant surface sites for adsorption of new reactants. This is not unreasonable, since both cyclohexene and cyclohexane preferentially adsorb face-on to the Rh(111) surface and occupy a 3×3 atom slab (FIG. 11) On average, a 12 nm FCC Rh cuboctahedron displays (111) planes comprised of 24×24 atoms (FIG. 11).

Continuous flow synthesis of Rh nanoparticles under microwave-assisted heating was demonstrated. Particle morphology and monodispersity can be finely controlled as a function of the flow synthesis method and the total residence time of reactant within the microwave cavity. Single-phase, continuous flow reactions were found to closely emulate the products obtained from batch syntheses, yielding well-defined and near-monodisperse Rh nanoparticle cuboctahedra in which the average nanoparticle size was directly affected by residence time. Model vapor-phase cyclohexene hydrogenation studies revealed that the cuboctahedral Rh nanoparticles are catalytically active. The a continuous, microwave-assisted flow methods of synthesizing Rh nanoparticles are more readily scalable, more energy-efficient, and faster than batch reactions required to obtain analogous products. Such flow synthetic methods show great potential to be used for large scale synthesis of various types of nanoparticles, as well as to provide access to kinetic morphologies that cannot be as easily obtained under conventional heating and from batch syntheses.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method of making a plurality of metal particles, the method comprising:
    injecting a metal particle precursor, a capping material, and a reducing agent into an inlet of a continuous flow microwave reactor, thereby forming a mixture within the continuous flow microwave reactor, wherein the inlet of the continuous flow microwave reactor is fluidly connected to an outlet of the continuous flow microwave reactor through a reaction vessel;
    flowing the mixture through the reaction vessel, wherein the metal particle precursor is reduced within the reaction vessel, thereby forming the plurality of metal particles; and
    collecting the plurality of metal particles from the outlet of the continuous flow microwave reactor;
    wherein the metal particle precursor is a metal salt;
    wherein the continuous flow microwave reactor comprises:
    a sample containment vessel, a microwave cavity, and a heating element;
    the sample containment vessel having a first end fluidly connected to a second end through a reaction vessel portion, the first end of the sample containment vessel being the inlet of the continuous flow microwave reactor, the second end of the sample containment vessel being the outlet of the continuous flow microwave reactor;
    wherein the reaction vessel portion is located within the microwave cavity and the inlet and the outlet are located outside of the microwave cavity;
    wherein the reaction vessel is in thermal contact with the heating element; and
    wherein the heating element comprises a bath and the reaction vessel portion is immersed within the bath.

2. The method of claim 1, wherein the bath comprises an oil bath.

3. The method of claim 1, wherein the bath comprises ethylene glycol.

4. The method of claim 1, the method further comprising heating the heating element to a temperature of from 100° C. to 200° C. using microwave irradiation.

5. The method of claim 1, further comprising heating the mixture to a temperature of from 100° C. to 200° C. using microwave irradiation.

6. The method of claim 1, wherein the sample containment vessel comprises a tube.

7. The method of claim 6, wherein the tube comprises a polymer.

8. The method of claim 1, wherein the metal salt comprises a metal selected from the group consisting of Ru, Rh, Pd, Pt, Au, Ag, Os, Ir, and combinations thereof such that the plurality of metal particles comprise a metal selected from the group consisting of Ru, Rh, Pd, Pt, Au, Ag, Os, Ir, and combinations thereof.

9. The method of claim 1, wherein the metal salt comprises a metal selected from the group consisting of Rh, Ag, and combinations thereof such that the plurality of metal particles comprise a metal selected from the group consisting of Rh, Ag, and combinations thereof.

10. The method of claim 1, wherein the metal particle precursor comprises a first metal precursor and a second metal precursor; wherein the first metal precursor is a first metal salt and the second metal precursor is a second metal salt, the first metal salt comprising a first metal and the second metal salt comprising a second metal, wherein the first metal is different from the second metal; and wherein the first metal precursor and the second metal precursor are provided at a ratio such that the molar ratio of the first metal to the second metal is from 1:99 to 99:1 such that the plurality of metal particles comprise a mixture of two metals and the two metals are provided at a ratio of from 1:99 to 99:1.

11. The method of claim 1, wherein the capping material comprises citrate, cetrimonium bromide (CTAB), cetrimonium chloride (CTAC), polyethylene glycol (PEG), polyvinylpyrrolidone (PVP), sodium dodecyl sulfate (SDS), or combinations thereof.

12. The method of claim 1, wherein the reducing agent comprises a borohydride, a citrate, an ascorbic acid, an amino acid, a surfactant, or a combination thereof.

13. The method of claim 1, wherein the reducing agent comprises ethylene glycol.

14. The method of claim 1, wherein the mixture is flowed through the reaction vessel at a flow rate of from 1 $cm^3$ $h^{-1}$ to 50 $cm^3$ $h^{-1}$.

15. The method of claim 1, wherein the mixture has a residence time within the reaction vessel of 35 minutes or less.

16. The method of claim 1, wherein the plurality of metal particles are a single metal.

17. The method of claim 1, wherein the plurality of metal particles have an average particle size of from 1 nm to 20 nm.

18. The method of claim 1, wherein the plurality of metal particles are substantially cuboctahedral in shape.

19. The method of claim 1, wherein the plurality of metal particles are produced at a rate of 20 mg/hour or more.

20. A method of making a supported catalyst, the method comprising: dispersing the plurality of metal particles made by the method of claim 1 onto a support material.

21. The method of claim 20, wherein the support material comprises $SiO_2$.

* * * * *